Sept. 16, 1969 R. W. PLUME 3,467,822

HEADLIGHT HOLDER AND ADJUSTER

Filed Aug. 18, 1967

INVENTOR.
Robert W. Plume

BY

E. J. Biskup
ATTORNEY

United States Patent Office 3,467,822
Patented Sept. 16, 1969

3,467,822
HEADLIGHT HOLDER AND ADJUSTER
Robert W. Plume, Utica, Mich., assignor to General Motors Corporation, Detroit, Mich., a corporation of Delaware
Filed Aug. 18, 1967, Ser. No. 661,670
Int. Cl. F21v 7/22
U.S. Cl. 240—41.6                                    7 Claims

ABSTRACT OF THE DISCLOSURE

A vehicle headlamp assembly wherein a sealed beam headlamp is peripherally retained within a headlamp receiving opening by compressive engagement with an elastomeric seal member. A connector assembly is fixedly attached to the electrical connectors of the headlamp and includes parti-spherical surfaces universally positionable about complementary surfaces formed on a bracket attached interior of the vehicle. The headlamp is accurately aimed by selective adjustment of the connector assembly and thereafter the connector assembly is rigidly secured to the bracket by clamping screws.

---

Currently, most vehicle headlamp assemblies require a multiplicity of parts to securely mount and accurately aim the sealed beam headlamp. For example, one headlamp assembly commonly utilized includes a subassembly for retaining and protecting the headlamp which, in turn, is adjustably mounted within a separate housing by a combination of aiming screws and springs. After the housing is bolted or otherwise attached to the vehicle, the headlamp is aimed by individually and selectively adjusting the aiming screws. Thereafter, an ornamental bezel is placed over the headlamp assembly to provide a decorative frontal appearance for the vehicle that must be removed and reattached if replacement or realignment of the headlamp is necessary. Thus, the time and complexity of initial installation due to the number of component parts is similarly encountered in subsequent repairs to the headlamp assembly. Additionally, because of its front unsealed exposure, the adjustment parts are subject to the road contaminants and, after periods of use, may become corroded and impair subsequent aiming of the headlamp.

The headlamp assembly, made in accordance with the present invention, reduces the number of required parts, simplifies installation of the headlamp, and provides a sealed unit not readily exposed to corrosive road elements. In this assembly, a sponge rubber sealing member is located within an annular headlamp receiving opening formed in the front fender panel of the vehicle. Inasmuch as this assembly does not require a headlamp bezel, the fender panel may be independently shaped to give the desired frontal styling. The sealing member has an inwardly facing surface that compressively engages the outer periphery of the seal beam headlamp at the juncture of the lens and the reflector. Welded, interior of the fender panel and rearwardly of the headlamp connectors, is a bracket having a slotted hemispherical socket portion formed therein. A plastic connector assembly, including the appropriate electrical receptacle and leads, is locked to the electrical connectors and has opposed parti-spherical surfaces slidably engaging the socket portion to permit universal adjustment of the headlamp about the socket portion and within the seal member. To assemble the headlamp, the connector assembly is drawn forwardly through the headlamp opening and locked onto the electrical connectors. The assembly, thus formed, is guided into the headlamp opening and inserted into the seal member at an angle. The parti-spherical surfaces of the connector assembly are then aligned with the socket portion and the headlamp and connector assembly are manually rotated to an approximate straight-ahead position. After a conventional headlamp aimer has established the correct aim, clamping screws are used to lock the connector assembly to the bracket.

It will be appreciated that the interior and sealed location of the headlamp adjusting mechanism made according to the invention and described above diminishes the likelihood that subsequent reaiming of the headlamp will be impaired by corrosive damage. Also, the plastic connector assembly eliminates another possible source of corrosion damage as well as providing a low friction adjusting mechanism for conveniently aiming the headlamp by selective positioning of a single component.

Accordingly, the objects of the present invention are: to provide a headlamp assembly that can be quickly and easily aimed by an adjusting mechanism that is not subject to corrosive damage because of road contaminants; to provide a headlamp assembly wherein the headlamp may be accurately aimed by selective positioning of a connector assembly rearwardly attached to the electrical connectors of the headlamp; to provide a headlamp assembly wherein a sealed beam headlamp is vertically retained in position by a seal member interposed between a headlamp opening and the outer periphery of the headlamp and wherein a connector assembly, fixed to the headlamp's electrical connectors, is adapted to be universally positioned with respect to a bracket attached interior of the vehicle front fender; and to provide an adjusting mechanism for a vehicle headlamp wherein a connector assembly, locked to the headlamp's electrical connectors, has opposed parti-spherical surfaces that engage and are universally positionable about complementary surfaces formed on an apertured hemispherical socket portion of a bracket attached interior of the vehicle fender, thereby permitting selective positioning and accurate aiming of the headlamp by adjustment of a single component.

These and other objects will be apparent to one skilled in the art upon reading the following detailed description, reference being made to the accompanying drawings in which:

FIGURE 3 is a rear view taken along line 3—3 in FIGURE 2; and

Figure 1:
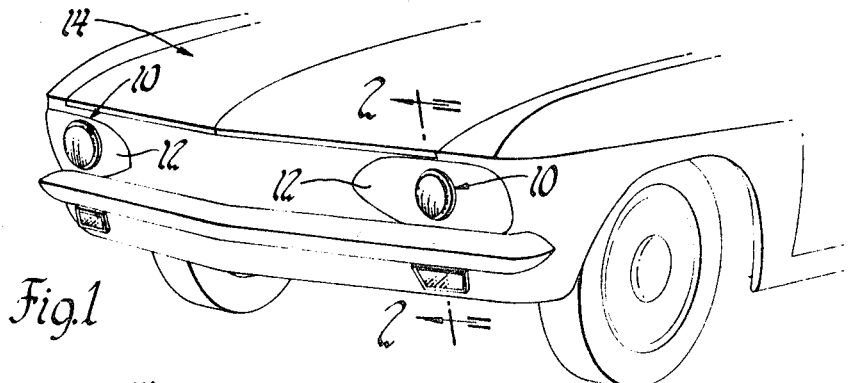
FIGURE 1 is a perspective view showing a headlamp assembly made in accordance with the present invention installed on a motor vehicle.

Referring to FIGURE 1, a headlamp assembly 10, made in accordance with the present invention, is shown mounted on the front fender panel 12 of a motor vehicle 14. While only a pair of headlamp assemblies 10 are shown, it will be understood that four similar assemblies could be provided for a twin-beam headlamp lighting arrangement.

Figure 2:
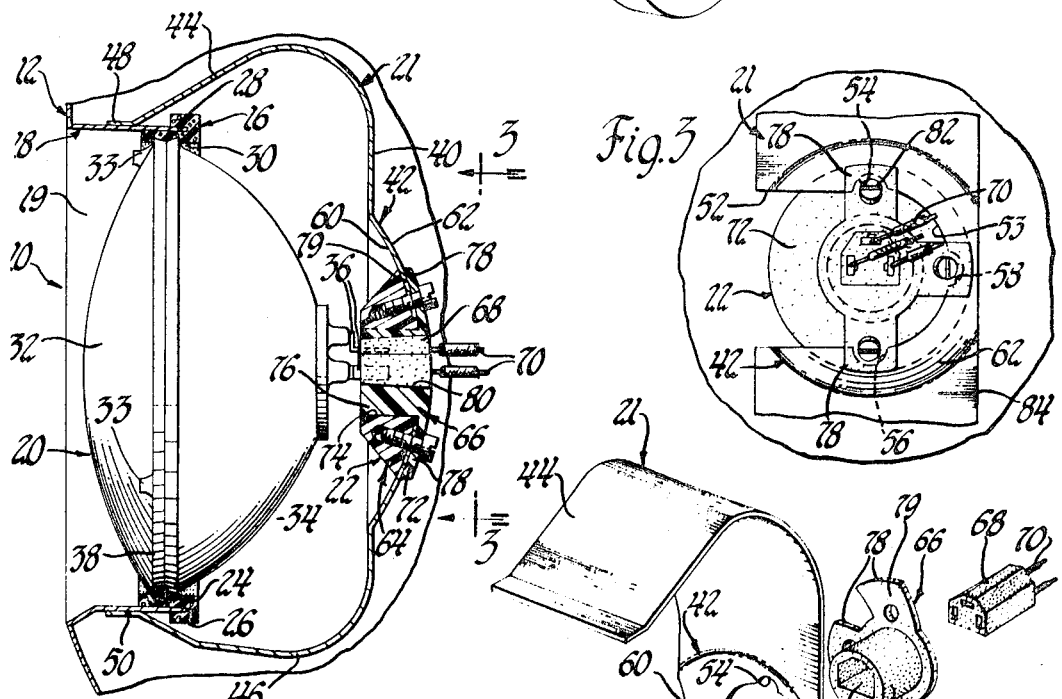
FIGURE 2 is a side cross-sectional view taken along line 2—2 in FIGURE 1.
Figure 4:
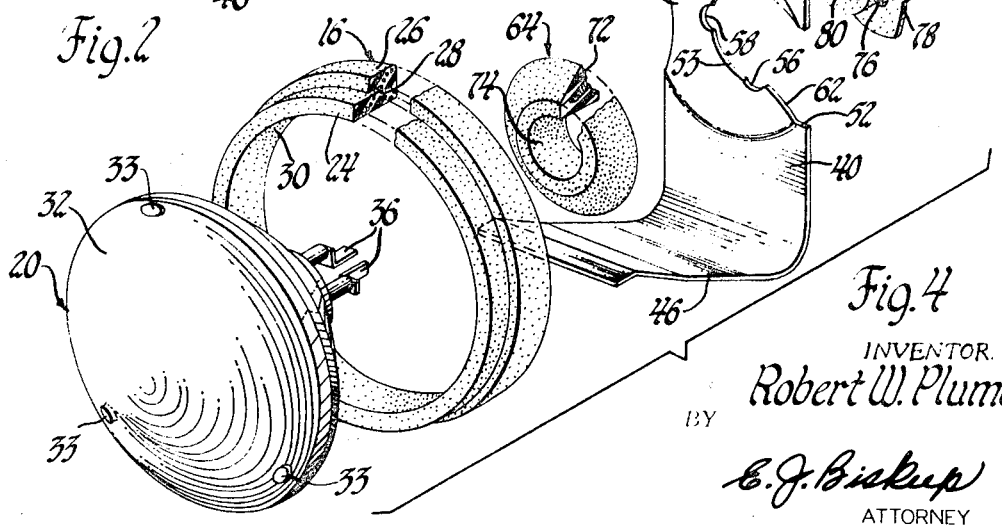
FIGURE 4 is an exploded view of the headlamp assembly shown in FIGURES 1 through 3.

The headlamp assembly 10 generally comprises a sealing member 16, a headlamp panel 18 attached to the fender panel 12 and defining a circular headlamp receiving opening 19, a conventional seal beam headlamp 20, a bracket 21, and a connector assembly 22. As shown in FIGURES 2 and 4, the sealing member 16, molded from sponge rubber, comprises an inner annular ring 24 and an outer annular ring 26 spaced therefrom by an axially extending circumferential groove 28. The rearward end portion of the headlamp panel 18 is seated within the groove 28 to axially position the sealing member 16. The groove 28 is sized so that inner ring 24 and outer ring 26 compressively engage the headlamp panel 18 thereby securely retaining the sealing member 16 within the opening 19. As will be described below, the inwardly facing surface 30 of the sealing member 16 compressively engages the headlamp 20 sufficiently to maintain the vertical positioning of the headlamp 20 while permitting universal movement about surface 30 during headlamp aiming.

The headlamp 20 shown in FIGURES 2 and 4 may be of a construction as shown in Arnold et al. 2,870,362, and generally comprises a forwardly facing lens 32 including aiming projections 33, a reflector base 34, and rearwardly extending electrical connectors 36. The lens 32 and reflector base 34 are conventionally fused together at their outer peripheries to form a sealed joint having an outwardly facing surface 38. In a manner now well known in the art, the aiming projections 33 define a plane having a known angular relation to a selected axis of the light beam projected by the headlamp 20 thereby facilitating precise geometrical aiming by a suitable adapted headlamp aimer. Additionally, the diameters of surface 30 and surface 38 are relatively sized so that, in assembly, the inherent elastomeric forces of the compressed sealing member 16 retain the headlamp 20 in the desired vertical orientation while permitting limited relative movement during the assembly and aiming operations to be described more fully below.

Referring now to FIGURES 2 and 4, the bracket 21, formed from a rectangular strip of sheet metal, includes a vertically extending middle portion 40 having a centrally located forwardly opening hemispherical socket portion 42, and reversibly bent forwardly extending end portions 44 and 46 spot welded to the headlamp panel 18 at points 48 and 50, respectively. A slot 52, formed in the middle portion 40, has a hemispherical terminal portion 53 concentric with the socket portion 42. Vertical notches 54 and 56 and a horizontal notch 58, formed at the edges of portion 52, and as will be described more fully below in conjunction with the connector assembly 22 and aiming projections 33, permit selective positioning of the headlamp about the customary horizontal and vertical aiming axes. The socket portion 42 is formed so that its opposed parti-spherical surfaces 60 and 62 have a radius of curvature substantially axially aligned with the axis of the headlamp 20.

As best seen in FIGURES 3 and 4, the connector assembly 22 comprises a clamp block 64, a clamp plate 66, and a conventional headlamp connector 68 including wire leads 70 connected to a suitably controlled electrical supply. The clamp block 64 has a generally frusto-conical configuration and includes a rearward parti-spherical annular surface 72, adapted to engage surface 60, and a cylindrical axial opening 74. The clamp plate 66 includes a cylindrical portion 76, adapted to be received within the cylindrical opening 74 of clamp block 64, and three flexible radially outwardly extending clamping tangs 78 formed at the rearward end thereof. The clamp block 74 and the clamp plate 66 in the preferred embodiment are injection molded from an acetal thermoplastic resin. The clamping tangs 78 are angularly spaced so that the centers thereof register with the notches 54, 56, 58 and have parti-spherical frontal surfaces 79 adapted to engage surface 62. The clamp plate 66 also includes a centrally located pentagonal-shaped axial opening 80 adapted to receive the complementary shaped headlamp connector 68. The headlamp connector 68 is provided with conventional detent means, not shown, adapted to fixedly engage the electrical connectors 36 to rigidly and electrically connect the connector assembly 22 to the headlamp 20. While the connector assembly 22 has been described as forming three separate pieces, namely the clamp block 64, the clamp plate 66, and the electrical connector 68, they are separately assembled and bonded together to form a unitary component that has been previously designated as the connector assembly 22. However, it should be noted that the three pieces may be integrally formed to reduce the cost and complexity of the assembly without impairing its intended function.

In the assembled position, the frontal surfaces 79 of the tangs 78 are rearwardly spaced from surface 72 of the clamp block 64, a distance approximately equal to the thickness of socket portion 42 so that the connector assembly 22 can be adjustably moved within slot 52 and universally positioned about the socket portion 42. When tightened, the clamping screws 82, threaded through the tangs 78 and into the clamping block 64 at positions radially inwardly of the hemispherical surface 53, serve to compress surfaces 72 and 79 into positive engagement with surfaces 60 and 62 to rigidly locate the connector assembly 22 to the bracket 21. Thus, the connector assembly 22 is positionable about the socket portion 42 with the confines of the notches 54, 56, 58 and portion 53.

To install the headlamp 20 and the connector assembly 22 to the vehicle 14, the installer pulls the connector assembly 22 forwardly through the headlamp opening 19 and locks connector block 68 onto the electrical connectors 36. The subassembly thus formed is then guided into the headlamp opening 18 and inserted into the sealing member 16 at an angle such that the connector assembly 22 clears outward edge 84 of the mounting bracket 21 and the spherical surfaces 72 and 79 of the connector assembly 22 are aligned with surfaces 60 and 62. The subassembly is then rotated to a straight-ahead position wherein the screws 82 are aligned with their respective notches 54, 56, 58 and one of the aiming projections 33 is aligned with the vertical axis of the opening 19. The headlamp 20 is then visually aligned and approximately positioned within the sealing member 16 will aid the installer in sliding the nector assembly 22. Moistening the inner surface 30 of the sealing member 16 will aid the installer in sliding the headlamp 20 to this position. Once the headlamp 20 has been approximately manually positioned, the connector assembly 22, in conjunction with a conventional headlamp aimer and the aiming projections 33, is selectively positioned to establish the correct optical aim. Thereafter, the clamping screws 82 are tightened to lock the connector assembly 22 to the bracket 21. In the final position, it will be noted that the connector assembly 22 provides the primary means for axially and radially maintaining the position of the headlamp 14 while the compressive elastomeric forces of the sealing member 16 provide a secondary means for maintaining the vertical alignment of the headlamp lens 32. Also, it will be noted that sealing member 16 provides an effective barrier to road contaminants that, in combination with the plastic connector assembly 22 and its rearward interior location, minimizes the possibility of corrosion damage that would impair subsequent aiming or replacement of the headlamp 20.

Since other changes and modifications will be apparent to one skilled in the art, the scope of the invention, as defined by the appended claims is intended to cover such alterations of the illustrative embodiment.

I claim:

1. A vehicle headlamp assembly located in a forwardly facing opening formed in the vehicle and comprising, a resilient seal member engaging the opening and having an axially extending inwardly facing surface, a sealed beam headlamp having a lens portion and a base portion, said lens portion and said base portion fused together to form a sealed joint having an outwardly facing surface adapted to compressively engage the inwardly facing surface of the sealed member, said headlamp located within said opening in a position wherein said lens portion faces forwardly and said outwardly facing surface of said sealed joint compressively engages said inwardly facing surface of the seal member, rearwardly extending electrical connectors formed on said base portion, a bracket attached to the vehicle and having a forwardly opening socket portion including a forwardly facing parti-spherical surface, said socket portion located rearwardly of the electrical connectors, an aperture formed in said socket portion, a connector member fixedly engaging the connectors received within the aperture and having a rearwardly facing parti-spherical surface engaging said opposed parti-spherical surface of said socket portion, said connector member and said aperture adapted to permit limited universal movement about the socket portion, and clamping means fixedly connecting said parti-spherical surfaces of said connector member to said socket portion.

2. The invention as recited in claim 1 wherein said lens portion includes at least three spaced surface elements defining a mounting plane having a known angular relation to the light rays projected by said headlamp.

3. The invention as recited in claim 2 wherein said bracket includes notches formed adjacent said aperture and disposed horizontally and vertically with respect to the axis of said opening and wherein said clamping means are disposed relative to said notches.

4. A headlamp assembly for a vehicle located in a forwardly facing opening formed in the vehicle and comprising, a resilient member engaging the opening and having an axially extending inwardly facing surface, a sealed beam headlamp located within the opening and peripherally engaging the inwardly facing surface, said headlamp having a forwardly facing lens portion and rearwardly extending electrical connectors, a bracket attached to the vehicle having a forwardly opening socket portion including opposed parti-spherical surfaces, said socket portion located rearwardly of the connectors, a connector member fixedly engaging the electrical connectors and having opposed parti-spherical surfaces separately engaging said opposed parti-spherical surfaces of said socket portion, an aperture in said socket portion permitting limited universal movement of said socket portion and said connector member, and means fixedly clamping the opposed parti-spherical surfaces of said connector member to said spherical portion.

5. A vehicle headlamp assembly located in a forwardly facing opening formed in the vehicle and comprising, a resilient seal member engaging the opening and having an axially extending inwardly facing surface, a sealed beam headlamp having a lens portion and a base portion, said lens portion and said base portion fused together to form a sealed joint having an outwardly facing surface adapted to compressively engage the inwardly facing surface of the seal member, said headlamp located within said opening in a position wherein said lens portion faces forwardly and said outwardly facing surface of said sealed joint compressively engages said inwardly facing surface of the seal member, rearwardly extending electrical connectors formed on said base portion, a bracket attached to the vehicle and having a forwardly opening socket portion including opposed parti-spherical surfaces, said socket portion located rearwardly of the electrical connectors, an aperture formed in said socket portion, a connector assembly fixedly engaging the connectors received within the aperture and having opposed parti-spherical surfaces separately engaging said opposed parti-spherical surfaces of said socket portion, said connector assembly and said aperture adapted to permit limited relative movement about the socket portion, and means fixedly clamping said opposed parti-spherical surfaces of said connector member to said socket portion.

6. A vehicle headlamp assembly located in a forwardly facing opening formed in the vehicle and comprising, a resilient seal member engaging the opening and having an axially extending inwardly facing surface, a sealed beam headlamp having a lens portion and a base portion, said lens portion and said base portion fused together to form a sealed joint having an outwardly facing surface adapted to compressively engage the inwardly facing surface of the seal member, said headlamp located within said opening in a position wherein said lens portion faces forwardly and said outwardly facing surface of said sealed joint compressively engages said inwardly facing surface of the seal member, rearwardly extending electrical connectors formed on said base portion, a bracket attached to the vehicle and having a forwardly opening socket portion including opposed parti-spherical surfaces, said socket portion located rearwardly of the electrical connectors, an aperture formed in said socket portion, a connector member having detent means fixedly engaging the electrical connectors received within the aperture and having opposed parti-spherical surfaces separately engaging said parti-spherical surfaces of said socket portion, said aperture adapted to permit limited relative movement connector member about the socket portion, and clamping means fixedly connecting said opposed parti-spherical surfaces of said connector member to said socket portion.

7. A vehicle headlamp assembly located in a forwardly facing opening formed in the vehicle and comprising, a resilient seal member engaging the opening and having an axially extending inwardly facing surface, a sealed beam headlamp having a lens portion and a base portion, said lens portion and said base portion fused together to form a sealed joint having an outwardly facing surface adapted to compressively engage the inwardly facing surface of the seal member, said headlamp located within said opening in a position wherein said lens portion faces forwardly and said outwardly facing surface of said seal joint compressively engages said inwardly facing surface of the seal member, at least three spaced aiming projections formed on said lens portion, said aiming projections defining a mounting plane having a known angular relation to the light rays controlled by said lens portion, at least one of said aiming projections aligned with the vertical axis of said opening, rearwardly extending electrical connectors formed on said base portion, a bracket attached interior of the vehicle and having a forwardly opening socket portion including opposed parti-spherical surfaces, said socket portion located rearwardly of electrical connectors, an aperture formed in said socket portion, notches formed adjacent said aperture and disposed horizontally and vertically with respect to the axis of said opening, a connector member having detent means fixedly engaging the electrical connectors received within said aperture and having opposed parti-spherical surfaces separately engaging said opposed parti-spherical surfaces of said socket portion, said aperture including notches adapted to permit relative movement of said connector member about the socket portion, and clamping means aligned with said notches fixedly connecting said opposed parti-spherical surfaces of said connector member to said socket portion.

References Cited

UNITED STATES PATENTS

| | | | |
|---|---|---|---|
| 1,300,725 | 4/1919 | Harris | 240—41.6 |
| 1,610,086 | 12/1926 | Gommels | 240—41.6 |

FOREIGN PATENTS

| | | |
|---|---|---|
| 637,163 | 2/1962 | Canada. |
| 131,019 | 1/1929 | Switzerland. |

NORTON ANSHER, Primary Examiner

ROBERT P. GREINER, Assistant Examiner

U.S. Cl. X.R.

240—44, 44.1

PO-1050
(5/69)

UNITED STATES PATENT OFFICE
CERTIFICATE OF CORRECTION

Patent No. 3,467,822                 Dated  September 16, 1969

Inventor(s)                Robert W. Plume

It is certified that error appears in the above-identified patent and that said Letters Patent are hereby corrected as shown below:

Column 3, line 15, cancel "suitable" and insert
-- suitably --.  Column 4, lines 26 and 27, cancel "will aid
the installer in sliding the nector" and insert -- by manual
adjustment of the connector--.

SIGNED AND
SEALED

DEC 23 1969

(SEAL)
Attest:

Edward M. Fletcher, Jr.
Attesting Officer

WILLIAM E. SCHUYLER, JR.
Commissioner of Patents